US005857912A

United States Patent [19]

Freitag et al.

[11] Patent Number: 5,857,912

[45] Date of Patent: Jan. 12, 1999

[54] SYSTEM FOR PLAYING ON SEVERAL DART GAME APPARATUSES SET UP REMOTELY FROM ONE ANOTHER

[75] Inventors: Bernd Freitag, Partenheim; Andreas Buchholz, Muenster-Sarmsheim, both of Germany

[73] Assignee: NSM Aktiengesellschaft, Bingen, Germany

[21] Appl. No.: 732,465

[22] PCT Filed: Apr. 15, 1995

[86] PCT No.: PCT/DE95/00527

§ 371 Date: Nov. 5, 1996

§ 102(e) Date: Nov. 5, 1996

[87] PCT Pub. No.: WO95/30872

PCT Pub. Date: Nov. 16, 1995

[30] Foreign Application Priority Data

May 5, 1994 [DE] Germany .......................... 44 15 795.9

[51] Int. Cl.$^{6}$ ...................................................... G06F 15/44

[52] U.S. Cl. .............................................. 463/42; 273/371

[58] Field of Search ................................. 463/30, 31, 36, 463/40, 41, 42; 273/371–376, 348, DIG. 26; 340/323 R; 364/410–411, 410.1, 411.1

[56] References Cited

U.S. PATENT DOCUMENTS

| | | | |
|---|---|---|---|
| 4,789,932 | 12/1988 | Cutter | 273/371 |
| 5,114,155 | 5/1992 | Tillery et al. | |

FOREIGN PATENT DOCUMENTS

| | | |
|---|---|---|
| 0443420 | 8/1991 | European Pat. Off. . |
| 4114544 | 11/1992 | Germany . |
| 4207497 | 9/1993 | Germany . |
| 4233980 | 4/1994 | Germany . |
| 4314145 | 11/1994 | Germany . |
| 88/03638 | 5/1988 | WIPO . |
| 94/09338 | 4/1994 | WIPO . |

*Primary Examiner*—Jessica J. Harrison
*Assistant Examiner*—Mark A. Sager
*Attorney, Agent, or Firm*—Venable; George H. Spencer

[57] ABSTRACT

The subject matter of the invention is a system allowing play on several games machines, in particular coin-operated machines, set up remotely from each other. The system comprises at least two games machines (2A, 2B) set up in different locations (A, B) and connected by a bi-directional connecting line (14). The games machines (2A, 2B) each have a target face (62) where the darts land and a device for detecting and displaying the position of a "hit" on the target face. The system also includes computers (6A, 6B) for processing, evaluating and transmitting data. A number of transmitter and receiver units are mounted outside the target face (62); their connecting paths across the target face (62, 70) form a raster and are intersected by darts landing on the target face. The raster is provided with co-ordinates, and data on the co-ordinate values of points at which the darts strike can be transmitted to another games machine for hit location and display.

16 Claims, 2 Drawing Sheets

Figure 4:
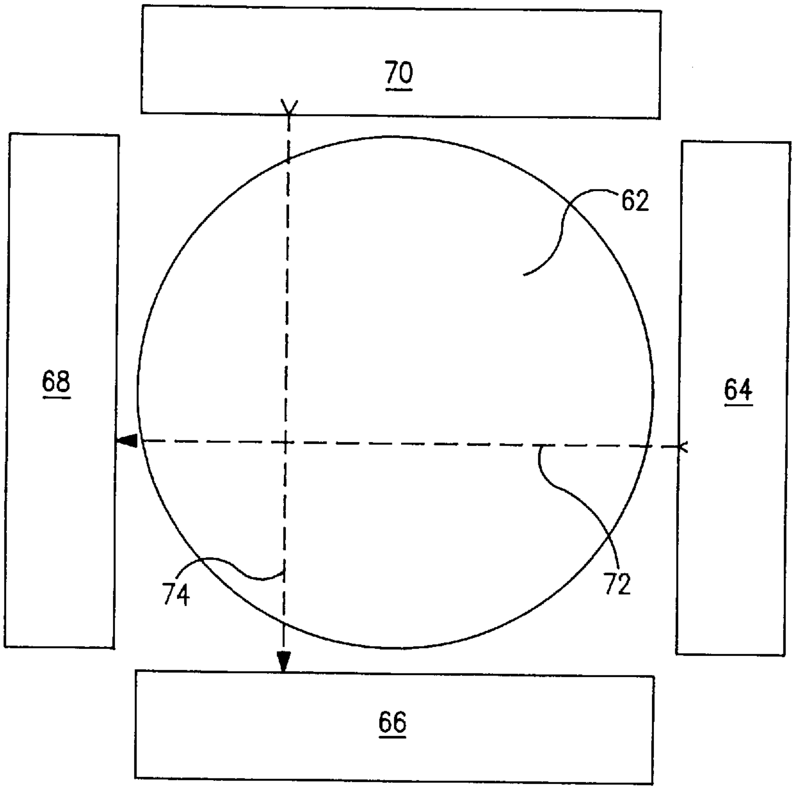

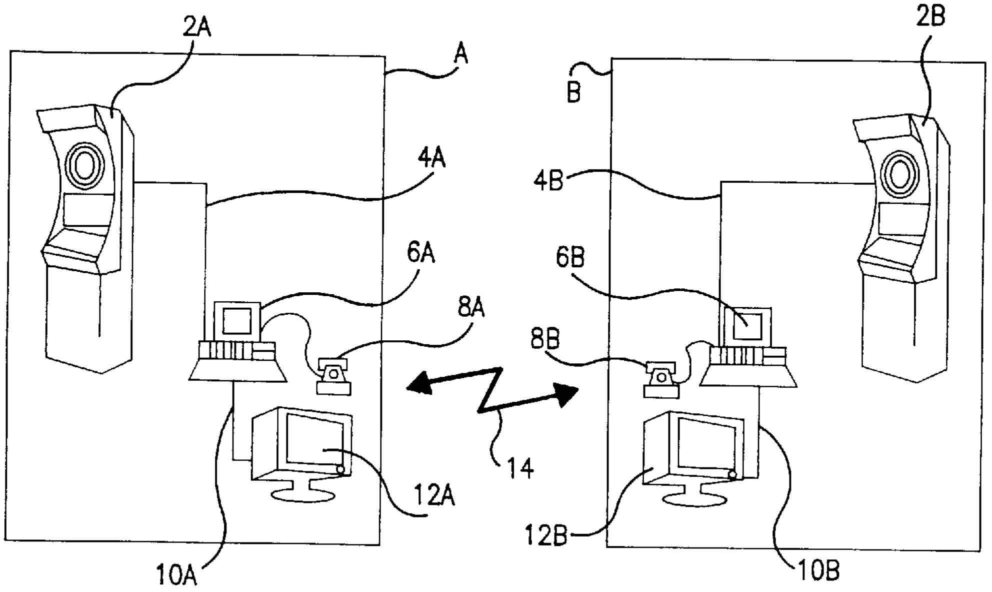
FIG. 1A
FIG. 1B
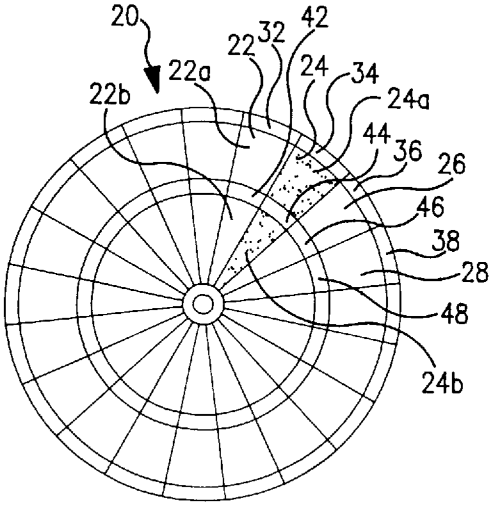
FIG. 2
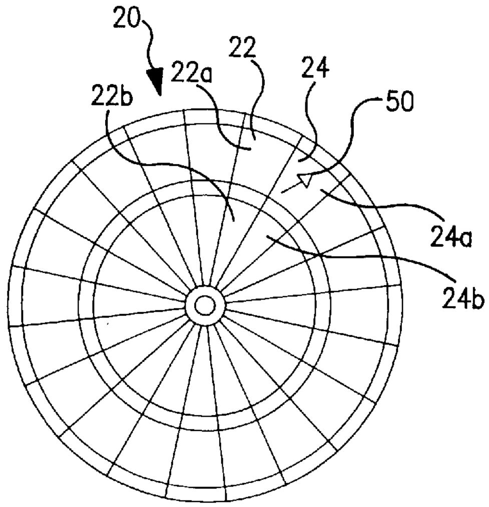
FIG. 3

SYSTEM FOR PLAYING ON SEVERAL DART GAME APPARATUSES SET UP REMOTELY FROM ONE ANOTHER

The invention relates to a system for playing on several, particularly coin-operated dart game apparatuses set up remotely from one another.

It is the object of dart games to hit preferably specific segments of a target disk, i. e., of a target for receiving the darts. Conventionally, hits are determined simply by looking at this target.

With the increasing possibilities of data communication, physical distances are less and less important. This means that the communication participants can exchange data etc. with one another regardless of the respective location, provided that the corresponding equipment and connecting lines are in place. Thus, it has also become possible to play on several entertainment apparatuses which are set up apart from one another. According to a proposal of the earlier patent application P 43 14 145, games can be played by way of a bidirectional connecting line between two entertainment apparatuses set up at different locations as if the game were played in only one location. The dialog between the apparatuses or players takes place via the bidirectional connecting line. Here, the entertainment apparatuses are advisably provided with a display which directly displays the game-relevant data, also those of the other apparatuses. In this manner, the score can be followed directly on the other apparatus. In particular, the result of the opposing player is displayed on the respective other entertainment apparatus. Games can also be played on a common field and the result of the respectively other player can be displayed by blinking or in another manner. Thus, the physical distance is hardly noticeable.

In the proposed system, dart game apparatuses can also be used as entertainment apparatuses.

In order to be able to play against one another on two or more dart game apparatuses which are set up so as to be physically apart from one another, at least the segments of the target (target disk) that were hit must be communicated to the other apparatus by way of remote data transmission. For technical reasons, the detection and transmission of hit data with respect to subdivisions of the segments on the hit field is very complex so that such a system concept with simple point scoring cannot differentiate between the inner and the outer ring. This is not satisfactory for players because they cannot get a feel for the respective playing strength of the opponent and they cannot adapt their tactics accordingly. But this is specifically one of the essential features of the game action which also accounts for its appeal.

A solution approach might now be to take a picture of the target field, i. e., the target, by means of a camera and Iraq to transmit it practically as a freeze frame to the respectively other dart game apparatus via the connecting line. But this again implies a very high degree of technical complexity because at least two cameras, data compressors, a high-capacity data link such as, for example, an ISDN line, data preparation, etc are required. The end result would be a rather small effect.

DE-A-42 07 497 describes an arrangement for determining the point where darts land on a target. The arrangement includes one or two supports having parallel holding bars disposed respectively opposite of one another whose edge ribs project above the plane of the target disk and respectively support a transmitter on one side and a receiver diametrically opposite of the transmitter. For detecting the position of a dart engaging the target, the transmitter/receiver pairs are moved along the target disk with the support ribs, with an engaging dart causing an interruption of the beam between transmitter and receiver, thus triggering a processing signal. When the yoke-like support with the transmitter/receiver pair is moved, occasional jamming may occur and, furthermore, an on-line detection of the dart position is not possible, rather this detection is a function of the drive processes in terms of time.

It is the object of the invention to create a system for playing on several, particularly coin-operated dart game apparatuses set up remotely from one another, which system allows a very precise, current display of the hit position.

According to the invention, this object is solved in a system having the features of claim 1. Advantageous modifications of the system according to the invention are the subject of the dependent claims.

Thus, a system according to the invention for playing on several, particularly coin-operated dart game apparatuses set up remotely from one another comprises at least two game apparatuses set up in two different locations, a bidirectional connecting line between the game apparatuses, respectively a target subdivided into segments for receiving the darts, an arrangement for detecting and displaying the hit position on the target and a computer for processing, evaluating and transmitting the data. Here, a number of transmitter and receiver elements is fixedly arranged outside of the target, with the connecting paths of the transmitter and receiver elements forming a raster over the target and being intersected by a dart landing on the target. Coordinates are assigned to the raster, with the values of the coordinates corresponding to the intersecting points being intended for a data transmission to another game apparatus for detecting and displaying a hit position.

The system of dart game apparatuses according to the invention makes it possible to play the dart game in different locations while offering a high game appeal. This is ensured especially by the fact that it is possible to display the hits of the respective hit field in a fairly precise manner. Naturally, the precision is determined by the degree to which the raster of the transmitter/element connecting paths is small-meshed. It is then only necessary to transmit the position coordinate values of this raster for the display of the hit position. This means that the volume of data to be transmitted is minute in comparison to that of a digitized image. As a result of the stationary arrangement of the transmitters and receivers, there is absolutely no tracking due to a cyclical movement for scanning the field; rather, the position of the darts that are currently engaging the target can be determined on-line. Furthermore, it is possible to determine not only the position with respect to an entire hit segment but to also differentiate between the inner and outer ring; optionally more precise information can be provided.

In a preferred modification of the system according to the invention, a frame is arranged outside of the target in which frame the transmitter elements and receiver elements are arranged. This then results in a constructive unit which can be assembled easily, wherein the frame is preferably comprised of strip-like elements. Advisably, these are arranged at right angles with respect to one another at a distance of approximately 50 cm. Parallel bundles of beams are therewith created which intersect at an angle of 90° C., thus resulting in a raster of X-Y coordinates.

Advantageously, the frame is made of impact-resistant material to avoid damage due to impact.

In order to reduce the dimensions and thus the expenditure for the sensor, the frame is arranged adjacent to the target. Diodes, particularly laser diodes, are preferably provided as sensor elements. Here, the transmitter and receiver elements may be arranged in the frame or in a frame element so as to alternate, i. e., a sequence of transmitter, receiver, transmitter, receiver, . . . is generated. Alternatively, the transmitter and receiver elements may also be provided so as to be respectively opposite of one another or, in any case, by regions.

The transmitter elements transmit steady or pulsed or intermittent light beams which are received by the respective receiver elements. An engaging dart interrupts the beam path of two light beams, particularly standing perpendicularly on top of one another. In this case, the respective receiver elements do not receive any light energy; this, in turn, makes it possible to determine the dart position in a subsequent evaluating circuit (comparator or A-D converter). The X-Y coordinates are determined in this manner. Thus, it is possible to indicate not only a hit segment but rather a hit point, in any case, at least a hit surface which is very small. Thus, the opposing player can see clearly how narrowly the other player has missed his target.

According to a preferred embodiment of the invention, a field, particularly a raster field, is provided corresponding to the target for the display of the hit position and a marker system displays the respective dart position. This representation practically completely takes the place of observing a physically existing target field at the same location.

Alternatively or in addition, a screen, particularly a large screen, can also be provided for the display of the hit position. Selectively, the representation can still be set on the screen. In the case of a large screen, several persons can follow the course of the game at the same time. Thus, not only the directly active players participate in the game action, but a larger group of persons can be integrated, which makes the game much more appealing and accounts for a much greater immediacy of the action. By means of such a large-screen display, it is possible to display, for example, team points, tables, scores, rankings of the players, etc.

For the communication link between the game apparatuses, i. e., bidirectional connecting line, a modem remote data transmission line can be provided.

In an advantageous embodiment of the system according to the invention, the computer is a personal computer. It may be disposed at the location of one of the game apparatuses, optionally also as a terminal at the respective location of the game apparatuses. Alternatively, a central computer is also possible which controls and processes the entire action. The computer, for example, is a personal computer of the installer, which computer is connected via a remote data transmission line. The computer may also be a specially developed controller.

The invention is described below in greater detail by way of preferred embodiments and the drawing. The drawing shows:

FIG. 1 a schematic illustration of a system according to the invention with two dart game apparatuses set up in two locations, FIG. 2 a hit display on a screen with only hit segment detection but without position display, FIG. 3 a hit display similar to FIG. 2 on a screen, but with additional position display, and FIG. 4 a schematic illustration of a target for receiving the darts, the target being surrounded by a frame having transmitter and receiver elements.

In the following, reference is made to FIG. 1 which illustrates the design of an embodiment of the system according to the invention with two locations. FIG. 1(*a*) shows the first location A, e. g., a local gaming location. FIG. 1(*b*) shows a location B, e. g., a second, physically separated gaming location. These locations are, for example, gaming arcades. A dart game apparatus 2A is located at location A, which dart game apparatus may in principle be of conventional design and function. The game apparatus 2A is connected via a line 4A with a computer 6A to which a remote data transmission apparatus 8A such as, for example, a telephone with modem is connected. In the embodiment shown, the computer 6A is a personal computer. It is connected via an additional line 10A to a large screen 12A for the display of hits.

The design of the units at location B is essentially similar; the corresponding equipment is identified by the letter “B” instead of the letter “A” and must therefore not be explained again in detail.

The two remote data transmission apparatuses 8A, 8B are connected with one another via a remote data transmission line 14. The remote data transmission line may be available, for example, by way of the telephone network, but it may also be an ISDN line, a network, etc.

According to the invention, the dart game apparatuses illustrated in FIGS. 1(*a*) and (*b*) are provided with an additional position evaluating unit. The position evaluating unit comprises a target-field representation with position display, as is illustrated in FIG. 3.

But first a representation of a hit is described for a screen having only segment hit display. Corresponding to the target mounted on the dart game apparatus, the hit field comprises a circular-shaped field 20 which is subdivided into segments 22, 24, 26, 28, etc. On the outside, the segments 22, 24, 26, 28, etc. are respectively delimited by circular ring segments 32, 34, 36, 38, etc. to delimit the playing field. They are additionally subdivided into partial segments $22_a$, $22_b$, $24_a$, $24_b$, etc. by further circular ring segments 42, 44, 46, 48, etc. If a hit is represented without additional position detection and position display, as is illustrated in FIG. 2, the hit position is only distinguished by segments. In the illustrated example, the segment 24 is the hit segment, but the opposing player cannot discern whether segment section 24*a* or 24*b* was hit.

The example illustrated in FIG. 3 which is realized in the dart game apparatuses 2A, 2B of FIG. 1 shows the advantage of an additional position detection and position display of a dart hit. The design of the target to be hit corresponds to that of FIG. 2 so that it is not described again. Identical reference numerals are used for identical parts. In this example, the dart that has hit the target is disposed on the segment section 24*a* of segment 24. A marker dart 50 serves for the representation of the hit position. In addition, this marker dart even shows the dart position within the segment section 24*a*. Thus, the opposing player can see that the preceding player did have a hit, but that it is located just at the edge of the playing field. The player can take this into account as the game progresses. Thus the game turns out to be more realistic, i. e., closer to players being present in person, and, in this manner, the incentive to play the game is greatly enhanced.

FIG. 4 shows an embodiment of a dart game target surrounded by frame strips. The target 62 is circular-shaped. The four frame strips 64, 66, 68, 70 are arranged respectively at a right angle to one another and closely adjacent to the target 62, resulting in a strip distance of 50 cm. Transmitter and receiver elements in the form of light-emitting diodes and sensors are incorporated into the strips 64 to 70, with the transmitters and receivers being disposed respectively opposite of one another. Thus, the frame strips 64 and

70 comprise transmitter elements and the frame strips 66 and 68 receiver elements. This results in intersecting light beams. An engaging dart interrupts the beam path of such beam pairs. In the illustrated embodiment, this is shown by the light beams 72, 74, with the positions of the corresponding transmitter and receiver elements supplying the X-Y coordinates of the hit position.

Beyond the above-described system variants, various modifications of the system according to the invention are, of course, possible. Therefore, these should not be seen as limiting the scope of the invention which is only determined by the claims.

We claim:

1. A system for playing on several, coin-operated dart game apparatuses set up remotely from one another the system comprising, having at least two game apparatuses (2A, 2B) set up in two different locations (A, B).

having a bidirectional connecting line (14) between the game apparatuses, respectively having a target (62) subdivided into segments for receiving darts, having an arrangement for detecting and displaying a hit position of a dart on the target, having a computer (6A, 6B) for processing, evaluating and transmitting data, having a number of transmitter elements and receiver elements which are fixedly arranged outside of the target, with the transmitter and receiver elements having connecting paths which form a raster over the target (62) and being intersected at a point by a dart landing on the target, wherein coordinate values are associated with the raster, wherein the values of the coordinates corresponding to the dart landing intersecting points are provided for a data transmission to another game apparatus for detecting and displaying a hit position.

2. A system according to claim 1, further comprising a frame (64, 66, 68, 70) which is arranged outside of the target (62), in which frame the transmitter elements and the receiver elements are mounted.

3. A system according to claim 2, wherein the frame is comprised of strip-like elements (64, 66, 68, 70).

4. A system according to claim 3, wherein the frame comprises two pairs of strip-like elements (64, 66, 68, 70) which are arranged at right angles with respect to one another.

5. A system according to claim 1, wherein the frame is made of impact-resistant material and is arranged adjacent to the target.

6. A system according to claim 1, wherein said transmitter elements are diodes.

7. A system according to claim 6, wherein said diodes are laser diodes.

8. A system according to claim 1, wherein transmitter elements and receiver elements are arranged in the frame so as to respectively alternate.

9. A system according to claim 1, wherein transmitter elements and receiver elements are arranged in the frame respectively in regions.

10. A system according to claim 1, further comprising a display field to display the hit position corresponding to the coordinates of the segments of the target.

11. A system according to claim 1, further comprising a field to display the hit position corresponding to the target and a marker symbol respectively displays the dart position.

12. A system according to claim 11 wherein said field is a raster field.

13. A system according to claim 1, further comprising a screen for the hit position display.

14. A system according to claim 1, wherein the game apparatuses (2A, 2B) are connected with one another via modem (8A, 8B) and remote data transmission line (14).

15. A system according to claim 1, further comprising a personal computer (6A, 6B) for processing, evaluating and transmitting the data.

16. A system according to claim 15, wherein the computer is a central computer which is a personal computer of an installer which is connected via a remote data transmission line.

* * * * *